(12) United States Patent
Guarneri

(10) Patent No.: US 9,776,598 B2
(45) Date of Patent: Oct. 3, 2017

(54) VEHICLE ALARM DEVICE

(71) Applicant: Salvatore Guarneri, Genoa (IT)

(72) Inventor: Salvatore Guarneri, Genoa (IT)

(*) Notice: Subject to any disclaimer, the term of this patent is extended or adjusted under 35 U.S.C. 154(b) by 0 days.

(21) Appl. No.: 14/760,571

(22) PCT Filed: Feb. 24, 2014

(86) PCT No.: PCT/EP2014/000474
§ 371 (c)(1),
(2) Date: Jul. 13, 2015

(87) PCT Pub. No.: WO2014/131501
PCT Pub. Date: Sep. 4, 2014

(65) Prior Publication Data
US 2015/0360645 A1 Dec. 17, 2015

(30) Foreign Application Priority Data
Feb. 28, 2013 (IT) .............................. GE2013A0026

(51) Int. Cl.
*G06F 7/00* (2006.01)
*B60R 25/10* (2013.01)
*B60R 25/045* (2013.01)
*B60R 25/24* (2013.01)

(52) U.S. Cl.
CPC ............ *B60R 25/10* (2013.01); *B60R 25/045* (2013.01); *B60R 25/1009* (2013.01); *B60R 25/24* (2013.01)

(58) Field of Classification Search
CPC .................................................... B60R 25/10
USPC ......................................... 340/426.11–426.36
See application file for complete search history.

(56) References Cited

U.S. PATENT DOCUMENTS

| | | | |
|---|---|---|---|
| 5,307,048 A * | 4/1994 | Sonders | 340/426 |
| 5,529,142 A | 6/1996 | Burke, III | |
| 5,533,589 A * | 7/1996 | Critzer | 180/287 |
| 5,793,306 A * | 8/1998 | Vershinin | 340/825.69 |
| 7,358,849 B1 * | 4/2008 | Pesina | 340/426.17 |
| 2005/0033483 A1 * | 2/2005 | Simon | B60R 25/04 701/1 |
| 2005/0203683 A1 * | 9/2005 | Olsen | B60R 25/1004 701/29.3 |
| 2006/0138863 A1 | 6/2006 | Jones et al. | |
| 2007/0296560 A1 | 12/2007 | Chen | |
| 2008/0079313 A1 | 4/2008 | Ellingsworth | |
| 2008/0238636 A1 * | 10/2008 | Birging | B60R 25/1004 340/426.1 |

FOREIGN PATENT DOCUMENTS

EP 0610902 A2 8/1994

* cited by examiner

*Primary Examiner* — Brent Swarthout
(74) *Attorney, Agent, or Firm* — Themis Law

(57) ABSTRACT

A vehicle alarm device has a control unit, provided with a transponder presence detector, and a mobile transponder; the control unit is connected to the electric system of the vehicle and is provided with a means for the interruption of a service of the electric system when the transponder presence detector does not detect the presence of the transponder when the transponder is moved away from the control unit. The service interruption means blocks the central locking of the doors and of the hatch of the vehicle.

8 Claims, 4 Drawing Sheets

VEHICLE ALARM DEVICE

BACKROUND OF THE INVENTION

The present invention relates to a vehicle alarm device.

Numerous and various alarm devices and anti-theft devices for vehicles are known.

Conventional anti-theft devices with remote control and those that use the CAN-BUS control unit Area Network system, a serial communication protocol with digital Area Network interface, are subject to duplication of the transmission codes, when the alarm or the central lock of the doors is activated.

Duplication occurs, as already known to law enforcement authorities, by means of electronic devices located in the vicinity of the car of the victim. Those devices are also capable of emitting rapid transmission sequences, generating strings of bit codes until the vehicle opens.

EP0610902 discloses an anti-theft device for a motor vehicle wherein a personal identification unit is carried by an authorized operator of said motor vehicle and includes means for identifying its location in the vicinity of the motor vehicle. A vehicle control unit mounted onto the vehicle inhibits the operation of the vehicle when the identification device is not in the vicinity of the vehicle.

The above described anti-theft device and the other conventional anti-theft devices do not disconnect the electric circuit of the central locks of the passenger doors and cargo door of a vehicle.

In fact, a weak point of the vehicle is the button inside the cabin, which opens and closes the central locks and remains always active and can be used by the intruder, for example to open the rear door of the trunk of a car or the cargo space of a van.

Intrusion in the vehicle, with consequent theft or damage, performed even for short stops, is in fact a common event.

The motorist stops, parks, closes the doors by means of the remote control key or by means of the anti-theft device, and the thief encodes the transmission, which he sends when the motorist goes away. The doors open and, regardless of whether the alarm sounds or not, the thief decides whether to complete the theft, taking away whatever he wishes and then fleeing.

Another example of a vehicle subject to this type of theft is constituted by vans of couriers or service vans with expensive work equipment. Those vans are often equipped with conspicuous external padlocks to lock all the cargo doors; however, especially couriers, who make many quick stops, usually just close the cargo doors with the key-based remote control of the vehicle, without placing padlocks, exposing the vans to the risk of intrusion described above.

In such case, the thief, when the vehicle stops and the driver goes away without placing the padlocks, somehow enters the cabin, through a window left open or by breaking a window or forcing the lock of the door, etcetera, and presses the central opening button, thus opening the cargo door, and performs the theft.

OBJECT OF THE INVENTION

The aim of the present invention is to provide a vehicle alarm device that overcomes the drawbacks of the cited prior art.

Within the scope of this aim, an object of the invention is to provide a vehicle alarm device that is capable of disconnecting completely the electric circuit of the central locks of the passenger doors/cargo door, or of other systems, such as for example the engine ignition.

Another object of the invention is to provide an alarm device that can be easily installed and adapted to all vehicles.

Another object is to provide a vehicle alarm device that can be installed without altering in any way the original electrical wiring of the vehicle, thus ensuring coverage by the warranty of the vehicle manufacturer.

Another object of the present invention is to provide a vehicle alarm device which is reliable and safe in use.

Another object of the present invention is to provide a vehicle alarm device that can be provided easily by using commonly commercially available elements and materials and is also competitive from an economic standpoint.

SUMMARY OF THE INVENTION

This aim and other objects that will become better apparent hereinafter are achieved by a vehicle alarm device comprising a control unit and a mobile transponder, where the control unit comprises a transponder presence detector, is connected to the electric system of a vehicle and is provided with a means for the interruption of a service of the electric system when the transponder presence detector does not detect the presence of the transponder when said transponder is moved away from the control unit. The vehicle alarm device includes a means for the interruption of a service acting on the central door locking circuit of said vehicle.

BRIEF DESCRIPTION OF THE DRAWINGS

Further characteristics and advantages will become better apparent from the description of preferred but not exclusive embodiments of the invention, illustrated by way of non-limiting example in the accompanying drawings, wherein.

DETAILED DESCRIPTION

Figure 1:
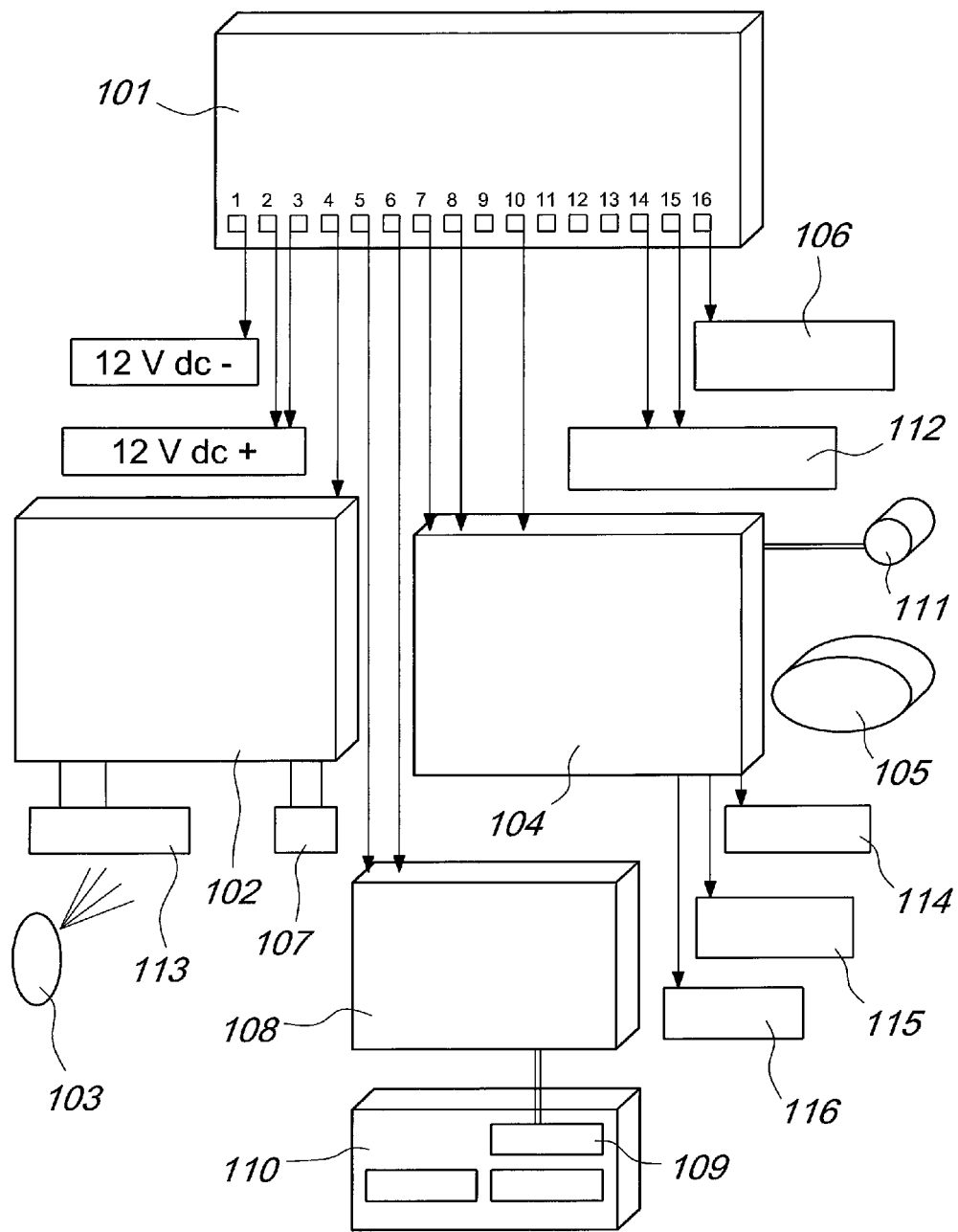
FIG. 1 is a block diagram of the device according to the present invention.

With reference to the cited figures, the device according to the invention comprises a wired control unit 101 with a transponder presence detector 102, a transponder 103, a GSM telephone GPS locator 104, a GSM SIM, not shown in the figures, a siren 105, a hood opening protection 106, a state indicator, namely an LED pilot light 107, and an additional battery (12 V 2 Ah) 113.

According to the present invention, the device has a relay board 108 for auxiliary and power circuits with connection cables and at least one connector 109 that has the same pitch and dimensions as those of commercially available fuses for insertion in a fuse box 110 on the circuit of the central locks of the passenger doors/cargo door.

The device can include an additional relay board for the management of other circuits, for example for engine cutoff, etcetera.

The device also comprises ultrasound sensors and a GPS antenna 111.

The device is connected to a dashboard key polarized control, to inputs and outputs with polarized control, to a transponder self-learning wire, and to external components.

In particular, the GPS-GSM 104 is connected to a fixed positive 114, to a dashboard key-controlled positive 115 and to a fixed negative 116.

Figure 2:
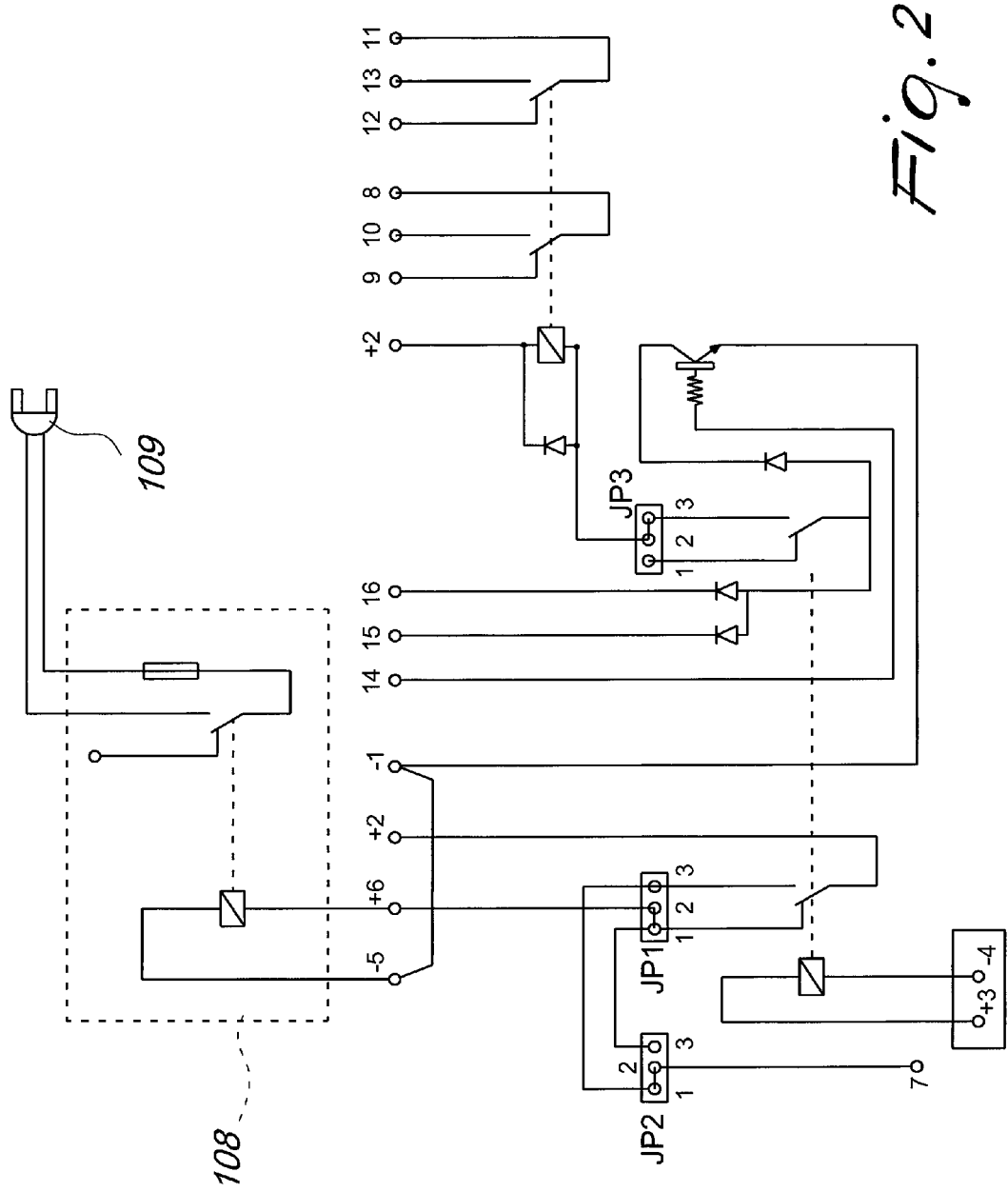
FIG. 2 is an electrical diagram of the control board and of the adapter of the alarm device.
Figure 3:
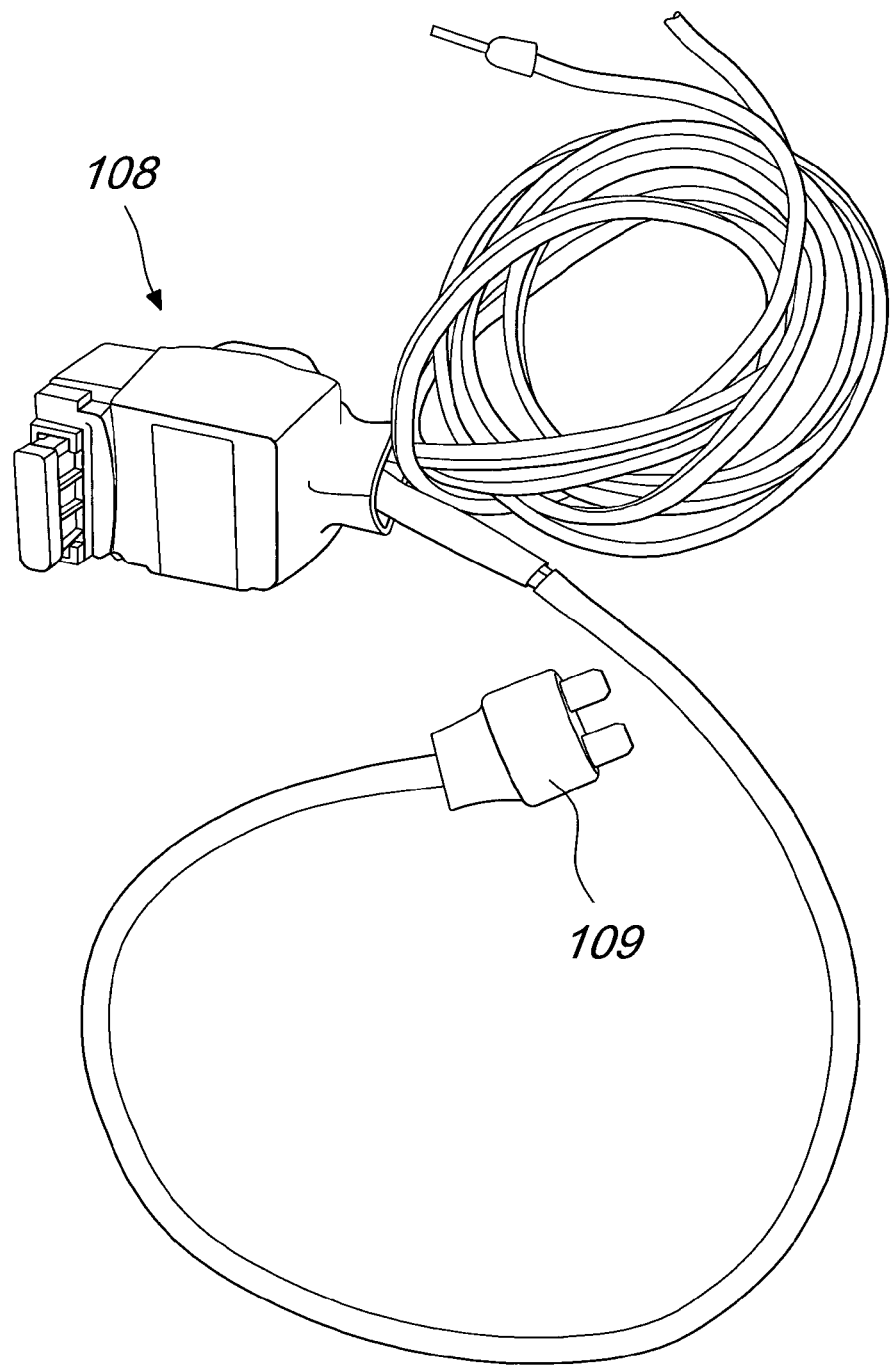
FIG. 3 is a perspective view of the adapter to be connected to the fuse box.
Figure 4:
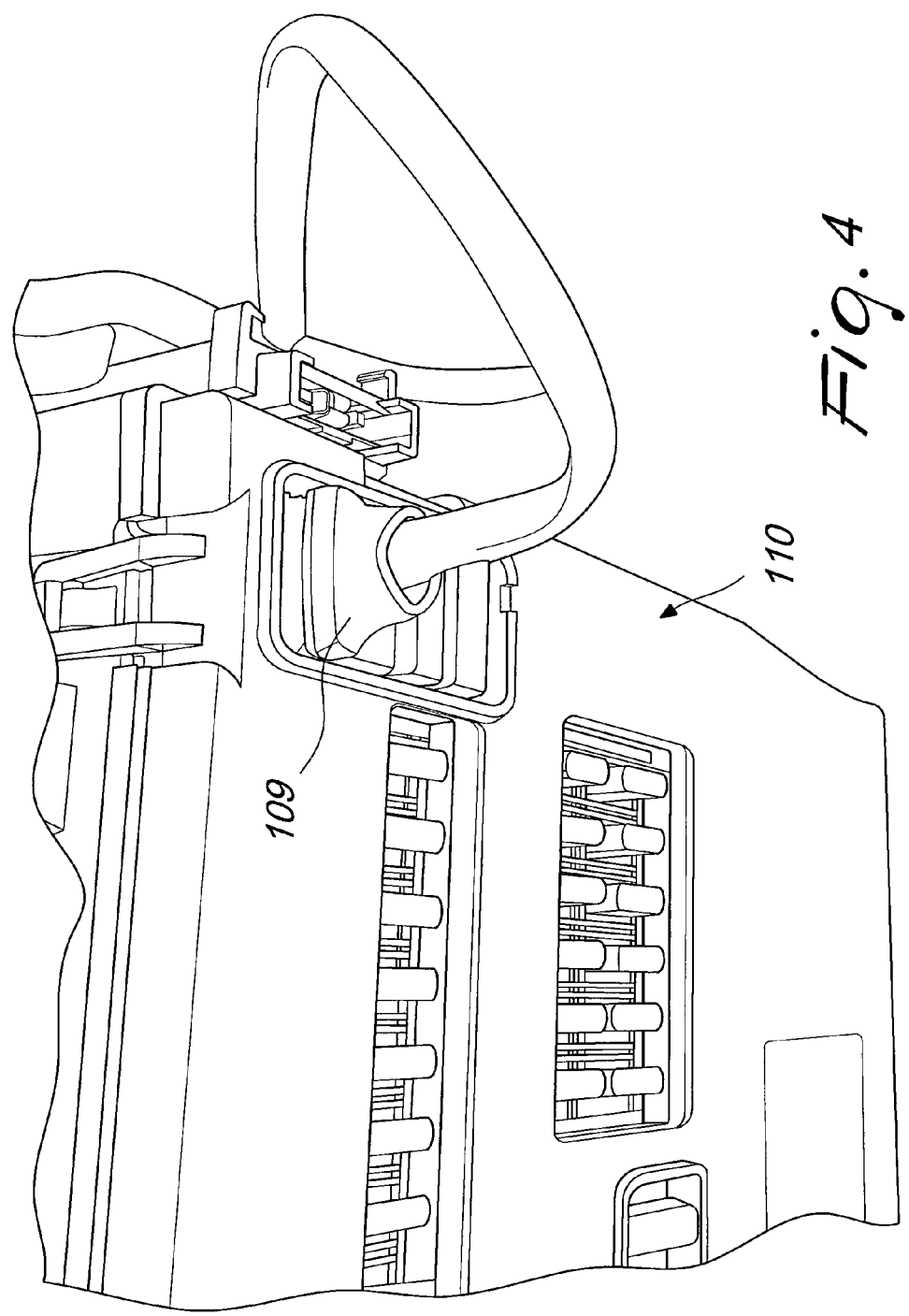
FIG. 4 is a schematic perspective view of the application of the adapter to the fuse box of a vehicle.

FIG. 2 is a view of an electrical diagram of the control board 101 and of the relay board 108.

The reference numeral 109 designates the adapter to be inserted in the fuse box 110 of the vehicle, replacing the fuse of the central opening closure circuit.

The reference numerals 1 to 16, in the electrical diagram of FIG. 2, designate the connections that correspond to the block 101 of FIG. 1.

The reference numerals 1 and 2 respectively designate the connection to the negative 12 V DC circuit supply and to the positive 12 V DC circuit.

The reference numerals 3 and 4 respectively designate the power supply input for alarm ready insertion: the reference numeral 3 designates the fixed positive and the reference numeral 4 designates the negative, which is absent in the presence of the transponder 103 in the car. The connector 4 is connected to the presence detector 102.

The reference numerals 5 and 6 designate the power supply output of the relay board 108, which in FIG. 2 is shown with the contacts at rest but energized when the circuit is powered by means of the contacts 1 and 2.

The reference numeral 7 designates the positive contact that is present when the alarm is engaged and ready and connected, in this constructive example, to the GSM telephone GPS locator 104.

The contacts 8, 9, 10 and 11, 12, 13 are alarm exchange contacts for external activations, such as the siren 105, the GPS-GSM 104, the engine cutoff and others.

The contact 14 is a positive alarm activation command that originates from a pulse for central opening from a remote control 112.

The contact 15 is a negative alarm activation command that originates from a pulse for central opening from the remote control 112.

The contact 16 is a negative contact 106 of the hood contact or of perimetric contacts (in the case of a camper van, for example).

The circuit operates with a negative command at terminal 4, which is absent when the transponder 103 is in the vehicle or close to it. The devices JP1, JP2 and JP3 allow to reverse this condition.

The operation of the device according to the present invention is as follows.

The transponder 103, similar to a remote control, can be used as a keychain together with the key of the car, but for greater protection in case of key loss it is preferably to carry it separately from the keys.

When the user, with the transponder, approaches the vehicle, the alarm control unit is deactivated and the pilot light 107 turns off.

The circuit of the central locks of the doors is connected to the system and can be opened normally by means of the original remote control key of the vehicle.

The user can then start the vehicle and use it normally.

At the end of use, the user gets off the vehicle and locks it by means of the original key remote control of the vehicle itself.

When the user moves away from the vehicle, carrying the transponder with him, at a certain distance the alarm device is activated automatically and disconnects the circuit of the central locks of the doors/cargo door, enabling the GPS-GSM locator services and any other systems such as the engine cutoff, etcetera. In this step the pilot light 107 is activated, for example by flashing.

If an ill-intentioned individual, having gained possession of the original keys of the vehicle, but without the transponder, or having duplicated the codes with electronic devices during the launching of the pulse to close the central locks of the doors, as described in the introduction, attempts to open the vehicle, without the transponder proximate to the vehicle itself when the radio pulse to open the doors is emitted, the doors would not open and the control unit would automatically detect the alarm signal, activating the siren, sending an SMS to the stored telephone number, making an automatic call, activating the engine cutoff, etcetera, according to the configuration of the device.

As already mentioned, in fact, the present alarm device can have various configurations, for example also a minimal equipment constituted by a siren and a control unit.

The GPS-GSM can send, via SMS, a link for Google, with the coordinates, longitude and latitude, and various other items of information and optional functions.

It is possible to put the system in service by means of a manual command inside the cabin, for perimeter protection, for camper use.

Various remote commands are possible, such as the activation/deactivation of the engine cutoff alarm, et cetera, by means of the GSM dialer, by means of alphanumeric SMS commands, which can also be managed by means of APP, Android, Apple applications.

The alarm device according to the invention has minimal power consumption, while the car is parked with the system engaged, and higher consumption during use.

In the case of long outdoor stays, there is an independent power source, such as for example a small photovoltaic panel located on the dashboard.

In practice it has been found that the invention achieves the intended aim and objects, a vehicle alarm device having been provided which can be installed easily by means of a simple connector that is sized to adapt to the connectors of the fuses that are normally present in the circuit of a vehicle.

The invention claimed is:

1. A vehicle security device for preventing theft of valuables inside a vehicle, said device comprising:
   a control unit; and
   a mobile transponder, said control unit comprising a transponder presence detector;
   said control unit being connected to an electric system of a vehicle for interruption of service of said electric system when said transponder presence detector does not detect a presence of the transponder when said transponder is moved away from said control unit;
   said control unit being configured to disconnect said central door locking circuit, or interrupt a power supply to said central door locking circuit, to thereby disable said central door locking circuit upon a failure of said transponder presence detector to sense the presence of said transponder,
   further comprising a relay board connected to said control unit and comprising at least one connector having a same pitch and dimensions as fuse connectors that are normally present in a fuse box of said electric system of said vehicle.

2. The security device according to claim 1, further comprising a siren that is activated by said control unit in case of attempted unauthorized use of the vehicle.

3. The security device according to claim 1, further comprising a state indicator constituted by a pilot light.

4. The alarm device according to claim 1, further comprising a GSM telephone GPS locator.

5. The security device according to claim 1, further comprising an auxiliary power source that is independent of said electric system of said vehicle.

6. The security device according to claim 1, wherein said interruption of service entails engine cutoff.

7. The security device according to claim 1, further comprising ultrasonic sensors.

8. The security device according to claim 1, further comprising a GPS antenna.

\* \* \* \* \*